Dec. 10, 1929.                J. BUCHLI                1,738,635
                           DRIVING COUPLING
                        Filed Feb. 28, 1927

Witness:
R. Burkhardt.

Inventor
Jacob Buchli,
By Cromwell, Keist & Wardine
attys.

Patented Dec. 10, 1929

1,738,635

UNITED STATES PATENT OFFICE

JACOB BUCHLI, OF WINTERTHUR, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

DRIVING COUPLING

Application filed February 28, 1927, Serial No. 171,401, and in Germany and Switzerland March 8, 1926.

This invention relates to driving mechanism and pertains particularly to a construction affording a flexible driving coupling between a driving shaft and a driven element which will accommodate relative displacement of the driving and driven members in various directions.

The general object of the invention is the provision of a construction suitable for making a driving connection between a driving shaft and a driven shaft which will accommodate relative displacement of said elements, both transversely of their axes and to various angular relationships.

A particular object is the provision of a construction which will afford a symmetrical or balanced arrangement of parts so that counterbalancing weights may be dispensed with.

Another object is the provision of such a construction particularly adapted as a driving connection between an actuating motor or the like and the traction wheels of a motor vehicle, such as a railway car or locomotive and which will accommodate relative movement of the driving element and the driven wheels or axle incident to the spring movement of the driving element.

Another object is the provision of a flexible driving coupling of the sort indicated, which is qualified to transmit high power and adapted for rapid operation without developing undue friction or resistance or cramping the connections.

Other and further objects will be pointed out or indicated hereinafter or will appear to one skilled in the art upon an understanding of the invention or its employment in practice.

In the accompanying drawing forming a part of this specification, I illustrate a structural embodiment of the invention, but it is to be understood that this is presented simply by way of example and is not to be construed in any fashion to limit the claims short of the true and most comprehensive scope of the invention in the art.

Figure 1:
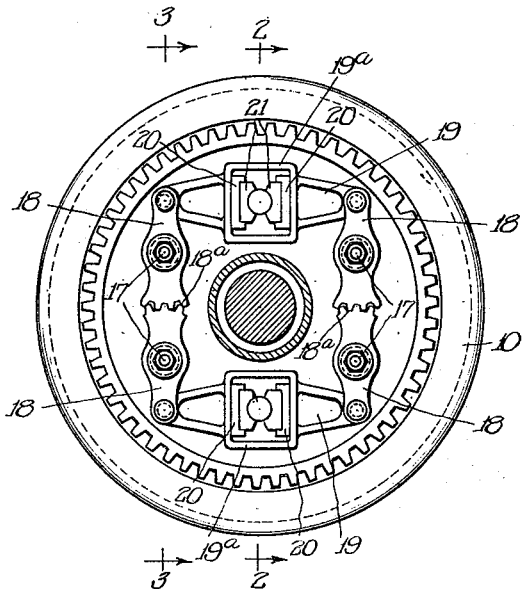
Fig. 1 is an elevational view of a driving connection coupling a driving gear to a locomotive wheel, the same showing the gear shaft and the wheel axle in section, as on the line 1—1 of Fig. 3.
Figure 2:
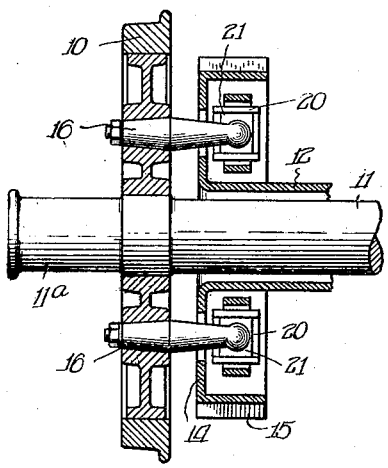
Fig. 2 is a sectional view on line 2—2 of Fig. 1.
Figure 3:
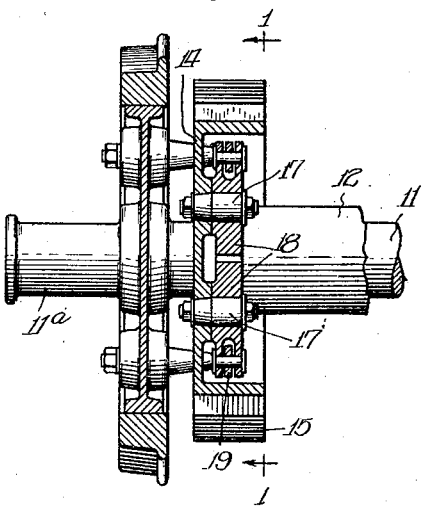
Fig. 3 is a sectional view on line 3—3 of Fig. 1.

The present invention provides a type of driving coupling for rotating members which permits, within certain limits, any desired variation in the relative positions of the driving element and driven element during running, it being possible to vary the angle of inclination of their axes and at the same time to displace them either in the axial direction or in directions transversely of their axes. Such a driving connection is desirable for the coupling of the driving motors and the traction wheels of electric locomotives, as those parts must be susceptible of relative movement, due to the fact that the frame portions on which the motors are carried are spring supported on the wheel axles or on the trucks in which the axles are journaled. Driving connections to be employed in such assemblies are subject to the limitation that the power transmitting connections between the driving and driven elements must be made at points about the wheel axle, as the latter is journaled at its ends; and when such eccentric connections are employed, problems are encountered in the proper balancing of the wheel. So, in addition to providing for a universal coupling between the driving and driven elements, the present invention provides an arrangement wherein the rotating parts are balanced. The nature of the invention may be ascertained from the illustrative embodiment shown.

As applied in the drawing, the reference numeral 10 designates a traction wheel of a locomotive, which is carried rigidly on an axle 11, a similar wheel being mounted near the opposite end of the axle, the ends of the axle affording journals 11$^a$. Encompassing the axle 11 is a hollow shaft 12 which carries at each end a drum 14 adjacent the wheel. This drum supports a gear 15 which may be driven from a motor or other prime mover to rotate the shaft 12. The wheel 10 rests upon the track rail, while the shaft 12 is supported on an independently movable portion, such as the frame of the car or locomotive. For purpose of convenient designation, the drum 14 and the parts rigidly connected thereto will be referred to as the driving element, while the wheel and the parts rigidly connected to it will be referred to as the driven element.

The driving connection between the driving element and the driven element includes a pair of crank pins 16 having fixed mounting in balanced relationship in the wheel 10, and a plurality of pins 17 having rigid mounting in the drum 14. Upon the latter are rotatably mounted levers 18 which are connected in pairs by yokes 19. These yokes include housing portions 19a which support slide bearings 20, and in these bearings are retained, for sliding movement in the axial direction of the wheel, the socket blocks 21. The crank pins 16 have spherical heads secured in the socket blocks 21 in such fashion as to permit of pivotal movement of the pins in the blocks. The levers 18 connected by one of the yoke members 19 are operably connected to those which are attached to the other yoke, through the medium of segmental gear portions 18a on equal radii from the pins 17. Considering the driving element as fixed in space, it will be observed that this interlocking of it with the driven element affords driving connection whereby rotational movement is transmitted positively from one of said elements to the other, while allowing relative universal movement between the elements. This universal relative movement is accommodated by the pivotal movement of the crank pins in the socket blocks 21 and the sliding movement of the socket blocks in the bearings 20, while the parts are held positively for rotational movement together by the interlocking of the levers 18. Consequently, the wheel 10 may accommodate itself to track irregularities, and the driving element may move relative to the wheel incident to compression or reflex movements of the car springs, without interfering with the transmission of power from the driving element to the driven element and without cramping the driving connections or subjecting them to destructive stresses. By virtue of the symmetrical construction, the rotating elements are balanced without requiring special provisions for that purpose. Furthermore, the construction permits the use of very short connections between the driving and driven elements, which obviates the necessity of making them excessively heavy, as they are not subjected to extreme leverages.

What I claim is:

1. In a driving coupling, the combination with relatively movable rotary driven and driving elements, of crank pins rigidly connected to the different elements, bearing members shiftably connected to pins on one of the elements and pivotally connected to pins on the other element, and interlocking connections between said bearing members retaining them against revolution relative to said elements.

2. In a driving coupling, the combination with relatively movable rotary driving and driven elements, of crank pins rigidly connected to the different elements, and flexible driving connections between the crank pins on different elements, said flexible connections comprising intermeshing segments pivoted on the pins on one element and bearing members connecting said segments to crank pins on the other element, said bearing members accommodating movement of said last mentioned crank pins in directions longitudinally and transversely of the axes of said elements.

3. In a driving coupling, the combination with relatively movable rotary driving and driven elements, of crank pins rigidly connected to the different elements, levers fulcrumed on the pins on one of the elements, said levers being connected in pairs by yokes, the levers of different pairs having movable intermeshing engagement, and the crank pins on the other of said elements having universal joint connection with said yokes.

4. In a driving coupling, the combination with relatively movable rotary driving and driven elements, of crank pins rigidly connected to the different elements in symmetrical arrangement about the axes thereof, levers fulcrumed on the crank pins of one of said elements for rocking movement in planes normal to the axis of said element, yokes symmetrically disposed relative to the axis of said element and connecting some of the levers, levers connected to different yokes having movable interlocking engagement, and bearing members forming universal joint connections between said yokes and crank pins on the other of said elements, whereby the levers may be rocked by relative movement of the crank pins on different elements in directions transversely of their axes.

5. In a coupling of the character described, driving and driven elements disposed for rotary movement and with their respective axes of rotation substantially parallel and disposed in substantially the same plane, and means providing an operating connection between said elements, said means including a plurality of pairs of intermeshing gear members carried by certain of said elements.

6. In a coupling of the character described, driving and driven elements disposed for rotary movement and with their respective axes of rotation substantially parallel and disposed in substantially the same plane, and means providing an operating connection between said elements while permitting of relative movement between the same in a direction transverse with respect to such axes, said means including a plurality of pairs of intermeshing gear members, such pairs being disposed on opposite sides of such axes and having their respective gear members pivotally mounted on one of said elements.

In testimony whereof I have hereunto subscribed my name this 11th day of February A. D. 1927, at Zurich, Switzerland.

JACOB BUCHLI.